2 Sheets—Sheet 1.
G. H. LITTLE.
INJECTORS.
No. 7,271. Reissued Aug. 22, 1876.
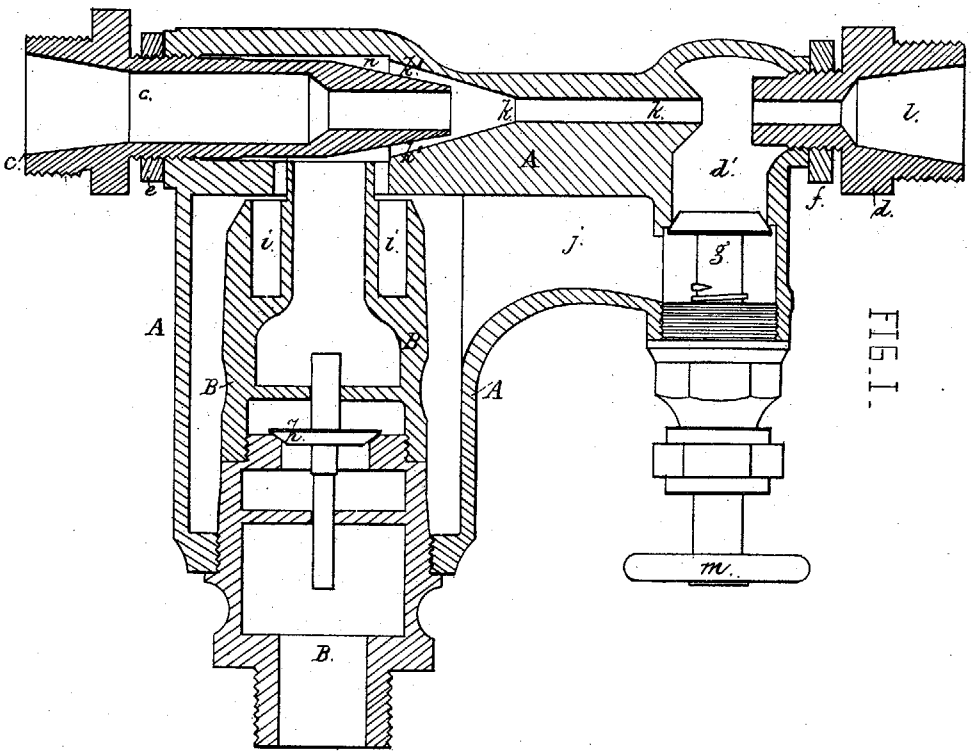
Witnesses.
Geo. T. Smallwood Jr.
John Hobey Jr.
Inventor.
George H. Little.
By John J. Halsted
His Atty.
N. PETERS, PHOTO-LITHOGRAPHER, WASHINGTON, D. C.

2 Sheets—Sheet 2.
G. H. LITTLE.
INJECTORS.
No. 7,271. Reissued Aug. 22, 1876.
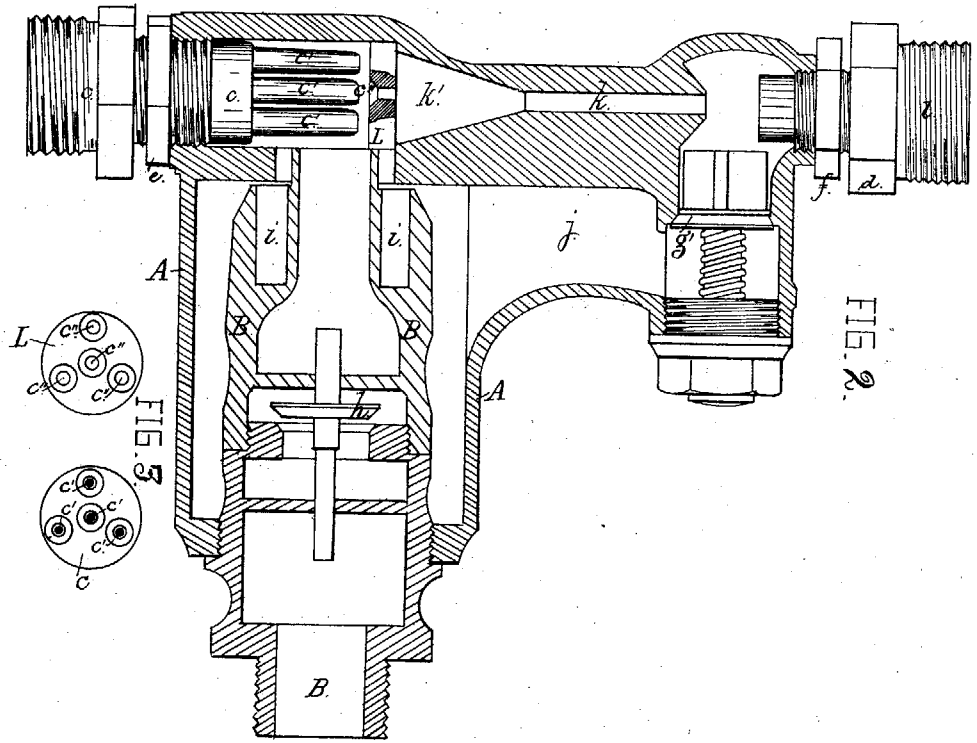
Witnesses.
Geo. T. Smallwood Jr.
John Roby Jr.
Inventor.
Geo. H. Little,
By John J. Halstead.
his Atty.
N. PETERS, PHOTO-LITHOGRAPHER, WASHINGTON, D. C.

UNITED STATES PATENT OFFICE.

GEORGE H. LITTLE, OF PEABODY, MASSACHUSETTS.

IMPROVEMENT IN INJECTORS.

Specification forming part of Letters Patent No. 156,671, dated November 10, 1874; reissue No. 7,271, dated August 22, 1876; application filed July 3, 1875.

*To all whom it may concern:*

Be it known that I, GEORGE H. LITTLE, of Peabody, in the county of Essex and State of Massachusetts, have invented certain Improvements in Injectors for Engine-Boilers; and I do hereby declare that the following, taken in connection with the drawings which accompany and form part of this specification, is a description of my invention sufficient to enable those skilled in the art to practice it.

My improvements consist in devices having for their object the creating of a circulation to start the injector without wasting water; the varying of the operative capacity of the steam or water without varying any tube or spindle to start the injector; the taking of water from the bottom of the boiler, or in water-line, and returning it above water-line, to create a circulation for heating purposes, and the taking of water at overflow as well as at regular suction, or both simultaneously.

In the drawings, Figure 1 illustrates an injector made in accordance with my invention. Fig. 2 is the same slightly modified; and Fig. 3, details.

A is the body of the injector; B, the water-inlet tube and well or chamber; *c*, an adjustable steam-inlet tube; *d*, an adjustable outlet-tube suitable for leading to the boiler. *e f* are gage or check nuts for varying and adjusting the distance that these tubes shall project into the injector, in order to graduate at will their operative capacity, the adjustment of tube *c* determining the quantity of water that shall be taken up by the steam in its passage through the injector, and the adjustment of the tube *d* being for the purpose of creating a greater or less vacuum in the overflow-chamber *d'*, to close up the check-valve *g*, and stop the water from coming into the chamber *j*, and also to enable the injector to start without wasting much water. These nuts *e* and *f*, besides the duty above named, in connection with the adjustable screw-threaded tubes, perform also another most important duty or function, which I will now describe. It is essential that the joints shall be tight at all times and under any adjustments; otherwise air will be admitted or sucked in and cause the current to break. Heretofore, where the quantity of water was regulated, packing-boxes have been used to prevent this leakage and its consequences. In my construction, however, the check-nuts perform this duty also, as well as that of holding the tubes to their adjusted positions, for they force the male and female threads tightly against each other, so as to close all possible chance of leakage, and also close the faces of the nuts tightly against the outer ends of the outer tubes. I thus dispense with packing-boxes and effect the same results in a simpler manner, and with the same gaging device by which the adjustments are regulated.

The check-valve *g* is arranged to be turned by the hand-wheel, as shown. The water-inlet is provided with a self-acting valve, *h*, and also with a permanent reservoir or chamber, *i*, which, from its position and location, will remain always full, and the injector consequently primed, so that the water contained in it shall be ready for use the moment the injector is started—a most important advantage, as it is well known that in ordinary injectors the water that would be carried back to the well would escape from the tube beneath the overflow and be wasted. The chamber *j* connects the overflow or vacuum chamber *d'* with the suction pipe or well, and carries the water back to it, and keeps the chamber *i* supplied. The inner end of tube *c* is made tapering, and that portion of the passage *k* which this end enters is made conical, so that when the tube *c* is adjusted forward by means of the check-nut *e* it shall fill more of the conical space *k'*, and proportionately diminish the water-supply or passage *k* between them, while an adjustment backward enlarges this capacity and increases the supply. The adjustment inward or outward of the inner end of tube *d*, by means of the check-nut *f*, in a similar manner, enlarges or diminishes the operative size of the vacuum-chamber *d'*. The outlet-mouth *l* of the tube leading to the boiler is made larger than its inlet-mouth. The valve *g* may be left open, at the option of the operator, after the injector is working from suction; but if left open it takes water for both places—viz., the suction and the overflow chamber. Upon letting on the water, the steam-valve is all that is required to work the injector. Should the steam be low, it may, however, be necessary to close the water-valve to start it against pressure.

The chamber *n*, instead of being tapered, as shown, may be straight, or of equal diameter throughout, the narrow passage *k* connecting abruptly therewith. The tube *c* in such case would not require a taper at its inner end, but it may taper and produce the same results. Its adjustment would give the same results, as heretofore described.

The injector can be used for throwing water in any place where hot water is required, for emptying or filling tanks; also, for heating water in steam-boilers, by taking it from the boiler, or in water-line, and returning it above water-line.

Figs. 2 and 3 show a modification, in which the tube corresponding to tube *c* in Fig. 1 is made with several small tapering exit-tubes, *c′ c′*, &c., instead of a single one. These tubes *c′ c′* may, like the tube *c* in Fig. 1, extend into the mouth *k′*; but they may be made shorter, as shown in Fig. 2, a plate, L, being provided, having passages *c″ c″*, corresponding in number to the number of tubes *c′ c′*.

When the tubes *c′ c′* extend into the mouth *k′* they should, of course, be so set as to conform somewhat to the shape of such mouth. The valve *g′* (shown in Fig. 2) is a self-acting one, which may be used instead of the one turned by the wheel *m*. (Shown in Fig. 1.) This improved injector is adapted in its construction so that it may be attached for use either to use tube *c* to admit steam, and tube B to admit water, as described, or vice versa, so that steam can enter at B, and water at the tube *c*; and in such case the adjustment of the tube *c* would serve to vary the supply of steam.

The check-nut *e* should be adjusted back for the highest pressure of steam, and then, when desired to work for a lower pressure, the valve (not shown) in the pipe which supplies B allows a regulation at will.

When the head of water is great the adjustment forward of tube *c* allows a sufficiency of water; and when the head is less the adjustment backward of tube *c* allows ample room to admit a sufficient supply. When the apparatus is so applied as to take water through *c* and steam through B, *c* is placed vertically, and the space between B and A becomes the priming-chamber.

I claim—

1. The combination, in an injector, of the tube *d*, made as described, the nut *f*, the tube *k*, and the overflow-valve *g*, Fig. 2, the nut affording a means of adjustment, serving to create a vacuum sooner or later at will.

2. In combination with the injector, the annular water reservoir or chamber *i*, made in the top of the tube B, and placed in the nearest practicable proximity to the tube *c*, substantially as and for the purpose set forth.

3. The combination, in an injector, of the priming-chamber *i* with the tube *c*, and with the tube B, whereby the injector is adapted to be applied in use with either the tube *c* or the tube B as the steam-receiving tube, substantially as described and shown.

4. The combination, with an overflow-chamber of an injector, of a pipe or passage surrounding the regular suction-pipe B, and communicating with it at or near its upper end, for carrying the overflow-water back to the water-supply or nozzle of the injector, or for conveying water from the supply-pipe B to the overflow-chamber by the opening of valve *g*, substantially as shown and described.

5. A water-supply pipe, B, of an injector, provided with a check-valve, *h*, at or near its upper end, substantially as shown and described.

6. In combination, the adjustable steam-inlet tube *c* and its adjusting-nut *e*, the adjustable outlet-tube *d* and its adjusting-nut *f*, the main tube or body A, water-inlet pipe B, connecting with the side of A, and an overflow, substantially as and for the purposes set forth.

7. In combination with an injector, a water-supply tube, B, provided with a self-acting valve, *h*, and an annular priming-chamber, *i*, and having a surrounding water-chamber between tube B and its case A, substantially as shown and described.

GEORGE H. LITTLE.

Witnesses:

GEO. F. OSGOOD,

WM. H. LITTLE.